United States Patent [19]

Flaum et al.

[11] Patent Number: 4,794,792

[45] Date of Patent: Jan. 3, 1989

[54] METHOD FOR DETERMINING FORMATION CHARACTERISTICS WITH ENHANCED VERTICAL RESOLUTION

[75] Inventors: Charles Flaum, Houston; James E. Galford, Sugarland, both of Tex.; Steven W. Ducket, Palo Alto, Calif.

[73] Assignee: Schlumberger Technology Corporation, Houston, Tex.

[21] Appl. No.: 164,367

[22] Filed: Mar. 3, 1988

Related U.S. Application Data

[62] Division of Ser. No. 915,439, Oct. 3, 1986.

[51] Int. Cl.⁴ ............................................. E21B 49/00
[52] U.S. Cl. ...................................... 73/152; 250/266
[58] Field of Search ................. 73/152, 1 R; 250/265, 250/266, 270, 269; 324/355

[56] References Cited

U.S. PATENT DOCUMENTS

| | | | |
|---|---|---|---|
| 3,406,359 | 10/1968 | Welz et al. | 324/1 |
| 3,493,849 | 2/1970 | Doll | 324/1 |
| 3,823,319 | 7/1974 | Tittman | 250/265 |
| 4,047,027 | 9/1977 | Bateman et al. | 250/264 |
| 4,092,536 | 5/1978 | Smith | 250/265 |
| 4,350,887 | 9/1982 | Barnard et al. | 250/265 |
| 4,379,228 | 4/1983 | Allen | 250/266 |
| 4,423,323 | 12/1983 | Ellis et al. | 250/264 |
| 4,486,836 | 12/1984 | Lacour-Gayet | 364/422 |
| 4,535,625 | 8/1985 | Lyle, Jr. | 73/152 |

Primary Examiner—Jerry W. Myracle
Attorney, Agent, or Firm—Henry N. Garrana; John H. Bouchard

[57] ABSTRACT

A method for determining a characteristic of a subsurface geological formation enhances the vertical resolution of dual-detector measurements by utilizing a continuous calibration factor which is obtained from an environmentally compensated characteristic derived from at least two resolution-matched sensor signals, and from a resolution-matched sensor signal from the near-detector of the tool.

24 Claims, 3 Drawing Sheets

METHOD FOR DETERMINING FORMATION CHARACTERISTICS WITH ENHANCED VERTICAL RESOLUTION

This application is a division of application Ser. No. 915,439 filed Oct. 3, 1986.

FIELD OF THE INVENTION

The invention relates to a method for determining a characteristic of a subsurface geological formation traversed by a borehole, wherein the vertical resolution of dual-detector measurements is enhanced.

DESCRIPTION OF THE PRIOR ART

Various characteristics of subsurface geological formations are determined through use of various types of logging tools which employ dual detectors, or signal sensors, and a signal source. Typically, the detectors, or signal sensors, are spaced from the signal source by different distances. The signal source transmits a signal into the subsurface geological formation, which signal is received by the signal sensors, or detectors.

For example, porosity measurements in a subsurface geological formation are generally performed by a dual-detector neutron porosity logging tool provided with a neutron-emitting source, or signal source, which continuously irradiates the formation under study. The resulting neutron population is sampled by a pair of neutron detectors, or signal sensors, spaced at different distances from the source. If the two-detector measurement is made at a sufficient distance from the signal source, the effect of borehole size and tool standoff are minimized by taking the ratio of the counting rates of the respective detectors. The ratio of counting rates from the detectors provides the basic tool response from which a porosity index, or ratio porosity, is obtained.

Each of the detectors, or signal sensors, has a different vertical resolution because of the different spacings of the detectors, or signal sensors, from the signal source. Unwanted contributions to the ratio porosity include contributions from elements of the environment of the investigation such as tool standoff, borehole size, mud cake thickness, borehole salinity, formation salinity, mud weights, etc. Unfortunately, unless using a signal source many orders of magnitude stronger than the largest now in use, the detectors of a dual-detector neutron tool must be located at shorter spacings than would otherwise be chosen. Unfortunately, full advantage of large source-detector spacing cannot be realized in practice. If the detectors are placed far enough from the source, the counting rates becomes unacceptably low. As a result, shorter source-detector spacings than the ideal are employed. As a consequence of the shorter source-detector spacings, the two registered counting rates are affected by porosity changes in slightly different ways. Hence, the porosity value derived from the ratio of these counting rates does not always reflect the true formation porosity.

The main advantage of ratio processing is that the resulting porosity is less affected by environmental factors than a porosity obtained from a single detector. However, such tools do not utilize two important features of certain types of dual-detector neutron porosity logging tools: the difference in the vertical resolution of the near and far detectors, or signal sensors, and the better statistical behavior of the near detector. Because of its distance from the signal source, the near detector is nearly twice as sensitive as the far detector to contrasts in porosity at bed boundaries and the near detector produces a higher count rate.

Another type of logging tool which utilizes two detectors is a dual-detector gamma radiation bulk density tool which is useful in determining the density of a subsurface geological formation. The density may be determined from the count rates of two detectors located at two different spacings from a common gamma radiation source. The detectors, or signal sensors, of the dual-detector gamma radiation bulk density tool likewise have a near detector which is more sensitive than the far detector, and a better statistical behavior.

Accordingly, prior to the development of the present invention, there has been no method for determining a characteristic of a subsurface geological formation utilizing a dual-detector logging tool, which method utilizes the increased sensitivity in vertical resolution of the near detector and the better statistical behavior of the near detector. Therefore, the art has sought a method for determining a characteristic of a subsurface geological formation wherein the vertical resolution of the characteristic of a formation is enhanced by utilizing the better vertical resolution and statistical behavior of the near detector. Furthermore, the art has sought a method for determining a characteristic of a subsurface geological formation which does not require any additional or new measurements to be made, whereby logging data from older wells can easily be reevaluated through such method.

SUMMARY OF THE INVENTION

In accordance with the invention, the foregoing advantages have been achieved through the present method for determining the density of a subsurface geological formation traversed by a borehole. The present invention includes the steps of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors; in response to the signal from the signal source received by the at least two signal sensors; (d) matching the vertical resolution of the generated sensor signals from the at least two signal sensors; (e) determining an environmentally compensated density from the at least two resolution matched sensor signals; (f) determining the density from the unmatched sensor signal from the signal sensor spaced the least distance from the signal source; (g) determining the density from the resolution matched sensor signal from the signal sensor spaced the least distance from the signal source; (h) determining the difference between the density of step (e) and density of step (g); and (i) combining the result of step (h) with the density of step (f) to determine the density, wherein the vertical resolution of the density is enhanced. Another feature of the present invention is the step of generating a tangible representation of the determined density having enhanced vertical resolution.

In accordance with the invention, another method for determining the porosity index of a subsurface geological formation traversed by a borehole is also disclosed. The present invention includes the steps of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated porosity index from the at least two resolution matched sensor signals; (f) determining a continuous calibration factor utilizing the environmentally compensated porosity index of step (e) and the resolution matched sensor signal from the signal sensor spaced the least distance from the signal source; (g) calibrating the unmatched sensor signal from the signal sensor spaced the least distance from the signal source by applying the continuous calibration factor thereto; and (h) determining a porosity index from the calibrated, unmatched sensor signal of step (g), wherein the vertical resolution of the porosity index is enhanced. Another feature of the present invention is that the step of generating a tangible representation of the determined porosity index having enhanced vertical resolution.

In accordance with the invention, a method for determining a characteristic of a subsurface geological formation traversed by a borehole is also disclosed. The present invention includes: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors, in response to the signal from the signal source received by the at least two signal sensors; (d) matching the vertical resolution of the generated sensor signals from the at least two signal sensors; (e) determining an environmentally compensated characteristic of the subsurface geological formation from a combination of the resolution matched sensor signals; (f) determining a continuous calibration factor by utilizing the environmentally compensated characteristic of step (e) and the resolution matched sensor signal from the signal sensors spaced the least distance from the signal source; (g) calibrating the unmatched sensor signal from the signal sensor spaced the least distance from the signal source with the continuous calibration factor; and (h) determining the desired characteristic from the calibrated unmatched signal sensor of step (g), wherein the vertical resolution of the desired characteristic is enhanced.

A further feature of the present invention includes the step of generating a tangible representation of the determined characteristic having enhanced vertical resolution. Another feature of the present invention is that the vertical resolution of the generated sensor signals from the at least two signal sensors may be matched by passing at least one of the generated sensor signals through a filter.

A further feature of the present invention resides in the fact that the generated sensor signal of the signal sensor spaced the least distance from the signal source may be passed through the filter. The characteristic to be determined may be the density of the subsurface geological formation; and the environmentally compensated characteristic may be an environmentally compensated density. The characteristic to be determined may also be the porosity index of the subsurface geological formation; and the environmentally compensated characteristic may be an environmentally compensated porosity index. A further feature of the present invention is that the continuous calibration factor may be utilized to indicate the presence of gas in the geological formation, or to indicate logging conditions in the borehole.

The method for determining a characteristic of a subsurface geological formation traversed by a borehole of the present invention, was compared with previously proposed prior art methods has the advantages of enhancing the vertical resolution of the characteristic by utilizing the better vertical resolution of the near detector to better illustrate contrast in the characteristic at bed boundaries; and does not require additional logging measurements, whereby logging data from older wells can be re-evaluated.

Although the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
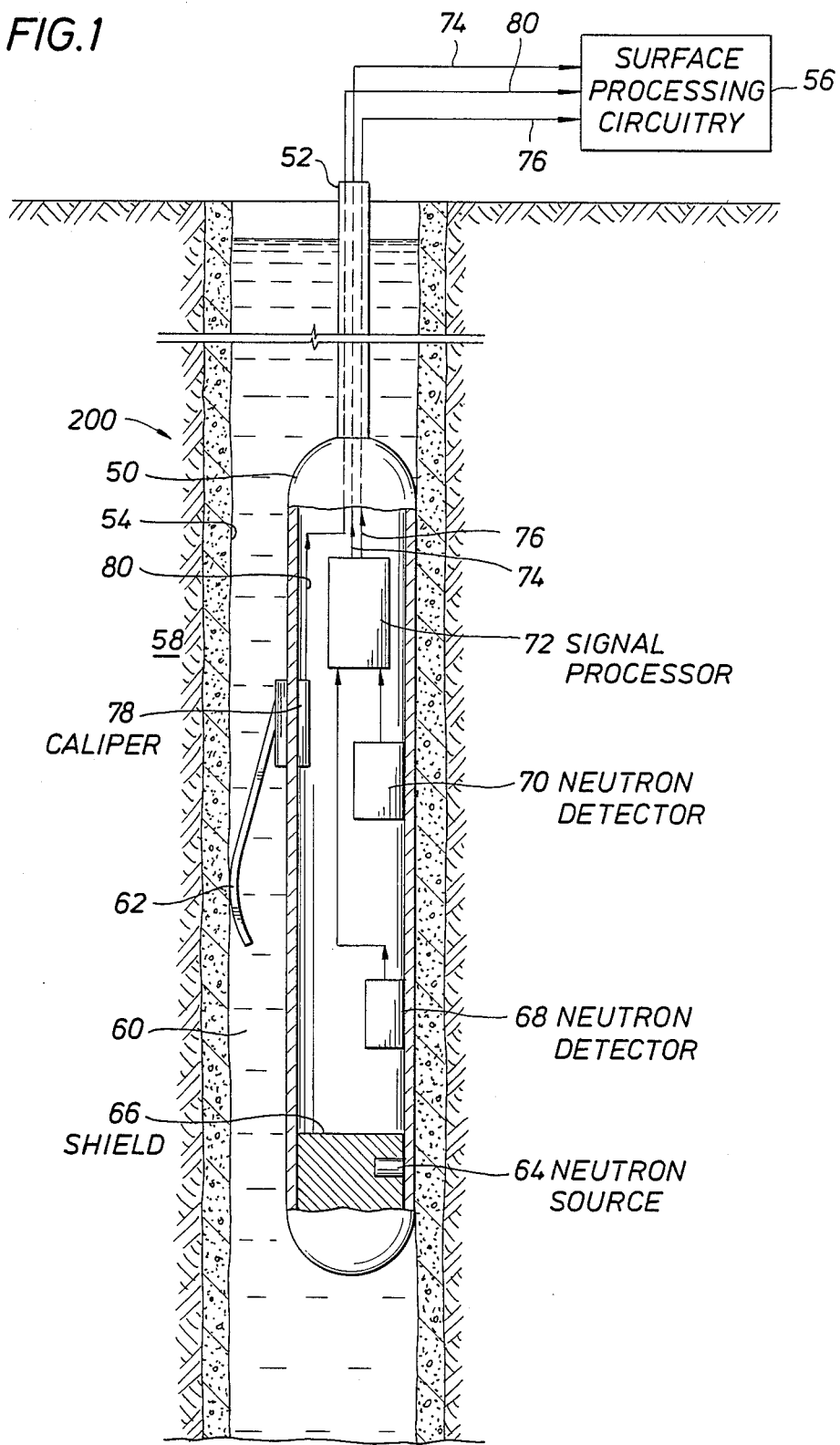
FIG. 1 is a schematic diagram of a dual-detector tool useful in practicing the methods of the present invention.

In FIG. 1, a representative dual-detector logging tool is illustrated. Logging tool 200, is preferably a compensated neutron logging tool, or dual-detector neutron tool, when the method of the present invention is utilized to determine a porosity index of a subsurface geological formation 58 traversed by a borehole 54. A fluid-tight pressure resistant housing 50 is suspended by an armored cable 52 in a borehole 54. Cable 52 comprises insulated conductors that electrically connect the equipment within the housing 50 with surface processing circuitry 56 at the earth surface. A winch (not shown) is located at the surface and is used to lower and raise the housing 50 of logging tool 200 in the borehole 54 to traverse subsurface geological formations 58.

The borehole 54 may be dry or may be filled with drilling mud 60, as shown. To reduce the influence of the mud 60, a decentralizing mechanism, for example, a resiliently activated arm 62, may be pivotally attached to the housing 50 and urges its opposite side against the borehole wall to prevent the mud 60 from intervening between housing 50 and formation 58.

A neutron source, or signal source 64, having a yield of typically $4 \times 10^7$ n/sec, is placed in the lower most end of the housing 50 adjacent to the side that abuts the formation 58. The source, or signal source, 64 may be any conventional neutron source utilized in logging tools 200, such as a "chemical" neutron source, for example, a mixture of plutonium and beryllium or americium and beryllium. Alternatively, neutron source 64 may comprise a neutron generator of the ion accelerator type. Because these sources 64 are isotropic, and emit neutrons with equal probability in all directions, a copper neutron shield 66 may be placed around most of the source 64, except, of course, the side adjacent to the borehole wall. Such a shield thus scatters the largest possible number of neutrons toward the adjacent portion of the formation 58 and thereby enhances the statistical accuracy of the measurements.

A signal, or neutrons, are transmitted, or emmitted, from the neutron source, or signal source, 64 and diffuse through the formation 58. The neutrons are then registered by a short-spaced neutron detector, 68, and a long-spaced neutron detector 70 which are mounted within the housing above and generally in line with, the source 64. Typically, the near and far detectors, 68, 70 or signal sensors, each comprise a hollow cylindrical cathode filled with a neutron sensitive gas. An anode wire (not shown) in the center of the cylinder creates a voltage gradient through the gas-filled cylinder, that enables ionized nuclear particles, produced as a consequence of neutron absorption within the gas nuclei to establish charged pulses in the detector electrodes. The long-spaced, or far, detector, or signal sensor 70 has a much larger volume than the short-spaced, or near, detector, or signal sensor, 68, in order to be more sensitive to neutrons. This arrangement of detectors having different sensitivities is provided to compensate for the exponential decrease in neutron population with an increased distance separation from the signal source 64.

It should be noted that the use of the terms "near-detector", "short-spaced" detector, or signal sensor "spaced the least distance from the signal source" are used to describe a detector conventionally used in a logging tool, such as logging tool 200, wherein the spacing of the detector, or signal sensor 68, from the signal source 64 is an optimum compromise between the ability of the detector to measure the desired characteristic of the formation 58, while providing the best vertical resolution of the desired signal from the signal sensor. In other words, if the detector is spaced too close to the source 64, the desired measurement cannot be made. Further, the foregoing terms are not intended to encompass non-functional or non-operative detectors.

Pulses, or sensor signals, from the detectors 68 and 70 are passed to a downhole signal processor circuit 72 for transmission to the surface processing circuitry 56 through two conductors 74 and 76, respectively, in the armored cable 52, after discrimination against noise and amplification in a conventional manner. A borehole size indication may be obtained from caliper 78 combined with the decentralizing arm 62. The caliper 78 may transmit to the surface equipment 56, through a conductor 80 in the cable 52, signals that represent the borehole diameter in a conventional manner.

Were the desired formation characteristic to be determined, for the subsurface geological formation 58 to be the density thereof, logging tool 200 would preferably be a dual-detector gamma radiation bulk density tool, as is conventional in the art. Such a dual-detector gamma radiation bulk density tool 200 would likewise have near and far detectors, or signal sensors, 68, 70 which would cooperate with a gamma radiation source 64, as is known in the art. Similar pulses, or sensor signals, would be generated from the two detectors, or signal sensors, 68, 70 and would be sent to a downhole signal processor circuit 72 for transmission to the surface processing circuitry 56 through two conductors 74 and 76, respectively, in the armored cable 52 after discrimination against noise and amplification, in a conventional manner.

Figure 2:
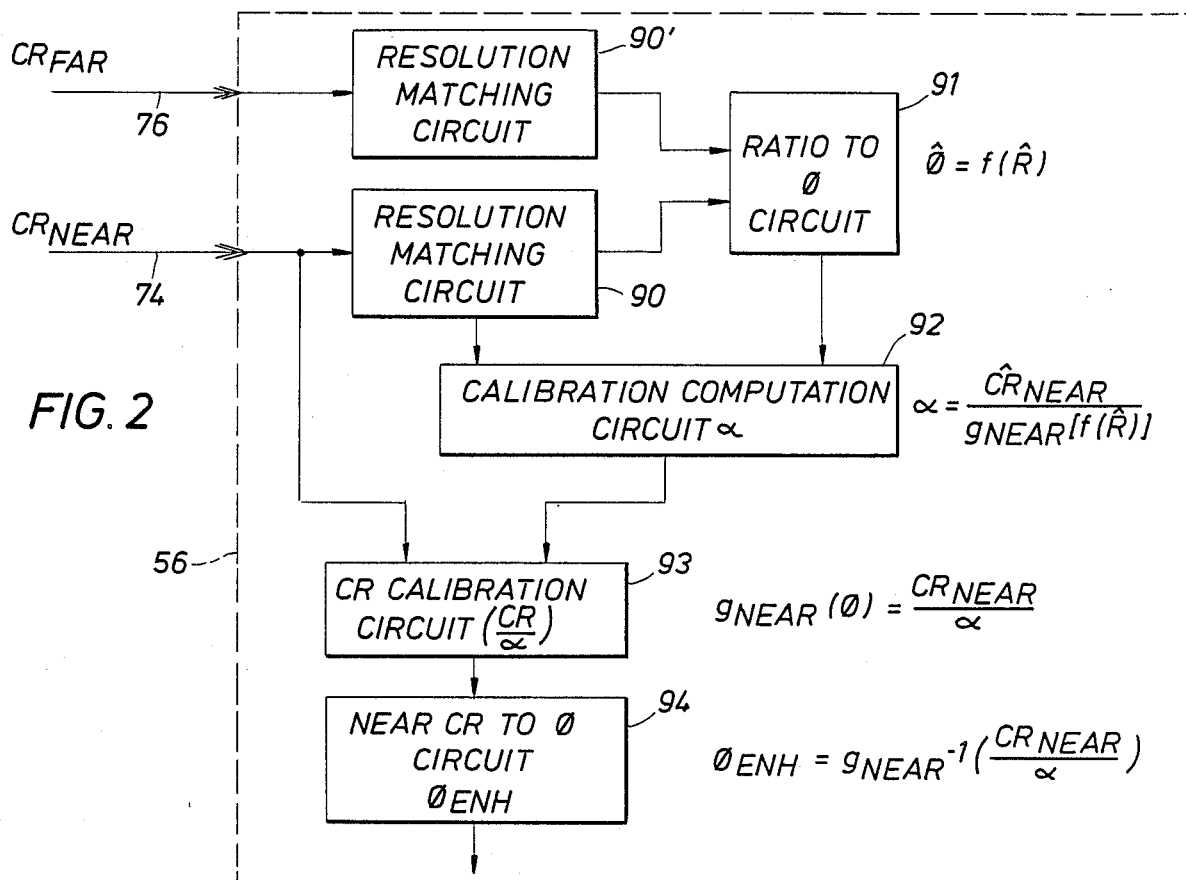
FIG. 2 is a schematic diagram of the circuit used to convert the neutron population measurements into porosity values.

With reference now to FIG. 2, a method for determining the porosity index of a subsurface geological formation 58 traversed by a borehole 54, will be described in connection with the surface processing circuitry 56 and the following equations. The pulses or generated sensor signals from the detectors 68 and 70, as is conventional in the art, are representative of the count rates of each detector 68, 70.

Count rates for each detector 68, 70 in the compensated neutron logging tool 200 have been measured in the laboratory and may be expressed as functions of porosity as follows:

$$\overline{CR}_{NEAR} = g_{NEAR}(\phi) \tag{1}$$

$$\overline{CR}_{FAR} = g_{FAR}(\phi) \tag{2}$$

where $\overline{CR}_{NEAR}$ and $\overline{CR}_{FAR}$ are the average count rates for the near and far detectors 68, 70; and $g_{NEAR}(\phi)$ is the near detector porosity-response function; and $g_{FAR}(\phi)$ is the far detector porosity-response function. Equations (1) and (2) represent the responses of the two detectors 68, 70 for ideal conditions, since laboratory formations are precisely drilled, homogenous, non-bedded, experimental constructions containing a single fluid. In a real borehole 54, the count rates generally do not match those from the laboratory; however, they may be expressed in the forms:

$$CR_{NEAR} = g_{NEAR}(\phi) \cdot \alpha_{NEAR}(x_1, x_2, \ldots, x_j) \tag{3}$$

$$CR_{FAR} = g_{FAR}(\phi) \cdot \alpha_{FAR}(x_1, x_2, \ldots, x_j) \tag{4}$$

wherein $CR_{NEAR}$ is the actual near detector count rate, $CR_{FAR}$ is the actual far detector count rate: $\alpha$ is a continuous calibration function for enhanced resolution processing, which will be hereinafter described in greater detail; and $x_j$'s are symbolic of various uncontrolled environmental factors such as mudcake and salinity in the borehole 54. In this context, the functional behavior of the $\alpha$ functions is expected to be such that their variance, with depth, will usually be less rapid than the variance of porosity.

Normal processing of compensated neutron logging data is based upon the premise that, to a first approximation $\alpha_{NEAR} = \alpha_{FAR}$ so that:

$$CR_{NEAR} = g_{NEAR}(\phi) \cdot \alpha \tag{5}$$

$$CR_{FAR} = g_{FAR}(\phi) \cdot \alpha \tag{6}$$

The foregoing equations may be converted to a ratio R of near- to far-detector counting rates, or $$R = \frac{\overline{CR}_{NEAR}}{\overline{CR}_{FAR}} \approx \frac{CR_{NEAR}}{CR_{FAR}} = \frac{g_{NEAR}(\phi)}{g_{FAR}(\phi)} \tag{7}$$

from which the foregoing ratio R, the porosity, $\phi$, can be computed by way of a functional relationship:

$$\phi = f(R) \tag{8}$$

For sensor signals, or count rates, from the detectors 68, 70 which have been previously resolution matched, as will be hereinafter described in greater detail, equation (5) and (6) can be rewritten to provide the following equations:

$$\hat{CR}_{NEAR} = g_{NEAR}(\hat{\phi}) \cdot \alpha \quad (9)$$

$$\hat{CR}_{FAR} = g_{FAR}(\hat{\phi}) \cdot \alpha \quad (10)$$

where $\hat{CR}_{NEAR}$ is the resolution matched count rate from the near detector 68; $\hat{CR}_{FAR}$ is the resolution matched count rate from the far detector 70. $\hat{\phi}$ is the porosity index from the ratio of resolution matched count rates, $\hat{CR}$, and is typically expressed as a fraction. The porosity index from the ratio of resolution matched count rates, $\hat{\phi}$, may be obtained by substituting the ratio of the resolution matched count rates, $\hat{R}$, into equation 8, so that, $$\hat{\phi} = f(\hat{R}) \quad (11)$$

With regard to the foregoing equations, it should be noted that $g_{NEAR}$ and $g_{FAR}$ are functions of a particular tool, such as compensated neutron logging tool 200, and these functions may be readily determined under laboratory conditions as is well-known in the art. Equations (9) and (11) thus contain two unknowns, $\hat{\phi}$ and $\alpha$ and may be solved in closed form to determine $\hat{\phi}$ and $\alpha$. Equation (10) could also be used, but the results would be identical since equation (10) is not independent of the other two equations, equations (9) and (11)). Thus, $$\alpha = \frac{\hat{CR}_{NEAR}}{g_{NEAR}(f(\hat{R}))} \quad (12)$$

Once $\alpha$ has been determined, it can be substituted into equation (5), together with the actual near detector 68 count rate, $CR_{NEAR}$ to provide the following equation:

$$\frac{CR_{NEAR}}{\alpha} = g_{NEAR}(\phi) \quad (13)$$

Equations (5) or (13) can then be inverted to compute an enhanced resolution neutron porosity index, $\phi_{ENH}$, which, when averaged over several levels of the formation 58, is equivalent to the ratio porosity, $\phi_R$. The enhanced resolution neutron porosity index $\phi_{ENH}$, which is typically expressed as a fraction, has been shown to have the vertical resolution and statistical accuracy of the near detector 68.

With reference now to FIG. 2, the method of the present invention for determining a porosity index, having enhanced resolution, will be described in further detail. As previously described, the sensor signal from the near and far detectors, 68, 70, or count rates, $CR_{NEAR}$, $CR_{FAR}$ are transmitted to the surface processing circuitry 56 through two conductors 74, 76 respectively, in the armored cable 52, after discrimination against noise and amplification. The generated sensor signals, or count rates, then have their vertical resolution matched by resolution matching circuits 90, 90'. Circuits 90, 90' typically include an averaging filter, which degrades the apparent vertical resolution of the signal from the near detector 68 to be the same as the vertical resolution of the far detector 70. In general, both signals, or count rates are applied to different, separate filters in circuits, 90, 90', so the outputs of each circuit 90, 90' both have the same vertical resolution. Dependent upon the output signal of the detectors, or the signal sensors, 68, 70, it would be possible to use only one averaging filter in circuit 90; however, it is preferred to use two averaging filters, one disposed within each circuit 90, 90'. Thus, if the vertical response characteristics of a detector 68, 70 are known, it is well-known in the art how to utilize two averaging filters to match the vertical resolution of the output signals. It should be noted that the output signal of circuit 90 is expressed by equation (9) and the output of circuit 90' is expressed by equation (10), previously described. The output of circuits 90, 90', or the resolution matched count rates, $\hat{CR}$, are fed into circuits 91, or the ratio to $\hat{\phi}$, circuit. Circuit 91 determines an environmentally compensated porosity index $\hat{\phi}$ from the ratio of the resolution matched count rates R. The environmentally compensated porosity index $\hat{\phi}$, determined by circuit 91 corresponds to equation (11), wherein $$R = \frac{\hat{CR}_{NEAR}}{\hat{CR}_{FAR}} \quad (14)$$

and $\hat{CR}_{NEAR}$ and $\hat{CR}_{FAR}$ are the two resolution matched sensor signals from circuits 90, 90'.

The output of the ratio to $\phi$ circuit 91, or the environmentally compensated porosity index $\hat{\phi}$, and the output of circuit 90, or the resolution matched sensor signal, or count rate $\hat{CR}_{NEAR}$ from the near detector 68 are then passed into the continuous calibration factor computation circuit 92. Circuit 92 thus determines the continuous calibration factor $\alpha$ in accordance with equation (12). The output of continuous calibration factor computation circuit 92 is then passed into a count rate calibration circuit 93 which also has the actual, unaveraged count rate $CR_{NEAR}$ passed therein and which count rate, $CR_{NEAR}$ has not been resolution matched. The count rate calibration circuit 93 thus calibrates the unmatched sensor signal or count rate $CR_{NEAR}$, from the near detector 68 in accordance with equation (13). The output of circuit 93 is then passed to a near count rate to $\phi$ circuit 94 which operates in accordance with the following equation (15) to determine an enhanced resolution neutron porosity index $\phi_{ENH}$, wherein the vertical resolution of the porosity index $\phi_{ENH}$, is enhanced. The equation which governs circuit 94 is:

$$\phi_{ENH} = g_{NEAR}^{-1}\left(\frac{CR_{NEAR}}{\alpha}\right) \quad (15)$$

As is conventional in the art, the output from circuit 94 may be transmitted to a conventional recorder in order to produce, or generate, a graph, or tangible representation, of the enhanced resolution porosity index, $\phi_{ENH}$, as a function of borehole depth.

With respect to compensated neutron logging tools, 200, count rates from the far detector 70 are usually more affected by gas in the subsurface geological formation 58, than the near detector 68 count rates because the far detector 70 "reads" more deeply into the formation 58. Simulation and laboratory data have shown that when gas is present in the formation 58, the continuous calibration factor $\alpha$ will have a value smaller than expected for a normal water filled formation. It has also been determined that other variations in the continuous calibration factor, from those expected from a normal water filled formation, may also indicate logging conditions in the borehole 54, such as logging tool 200 sticking, rugosity, or tool standoff. Further, logging data from older wells can be reevaluated in accordance with the present method, insofar as no new logging measurements are required to obtain the enhanced resolution neutron porosity index. All that is required are the actual, unaveraged count rates from the near and far detector 68, 70, which data is typically stored and has been previously obtained.

Figure 3:
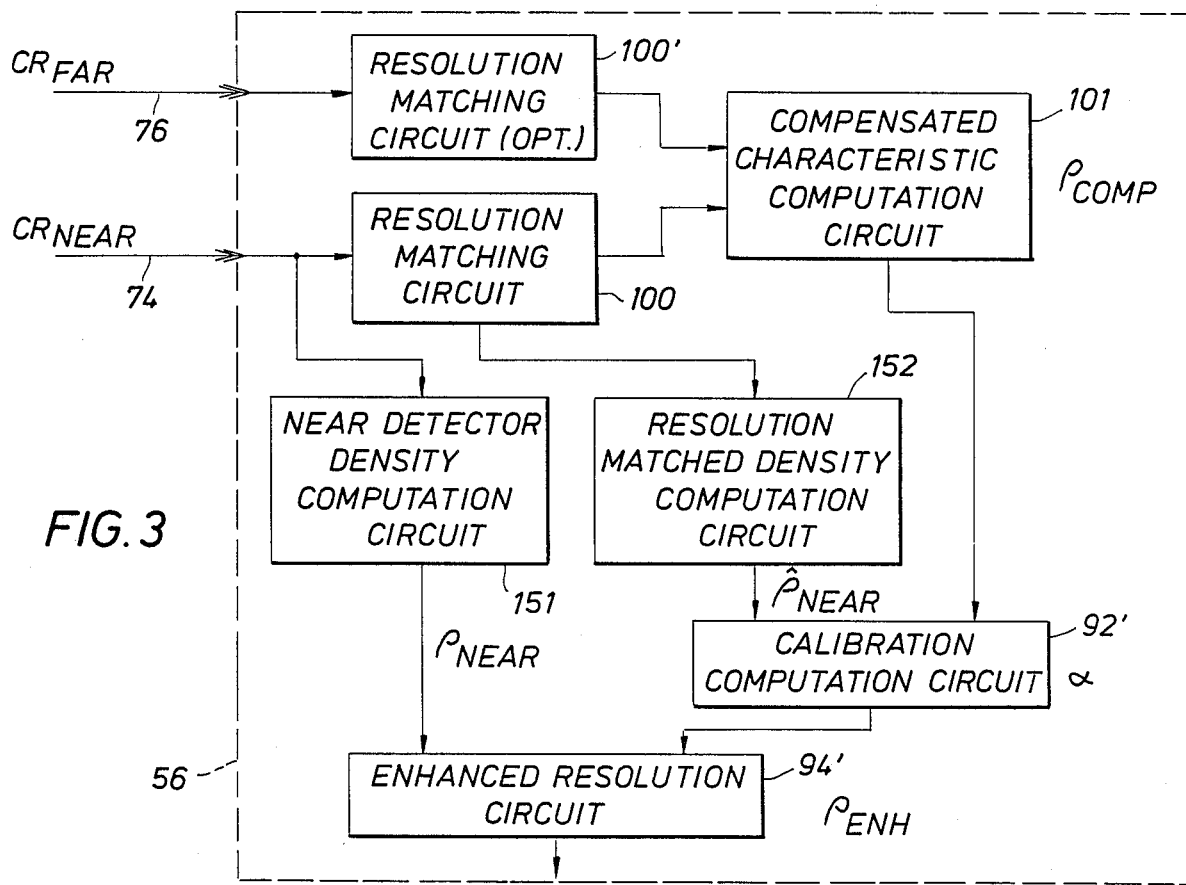
FIG. 3 is a schematic diagram of the circuit used to convert gamma radiation measurements into density values.
Figure 4:
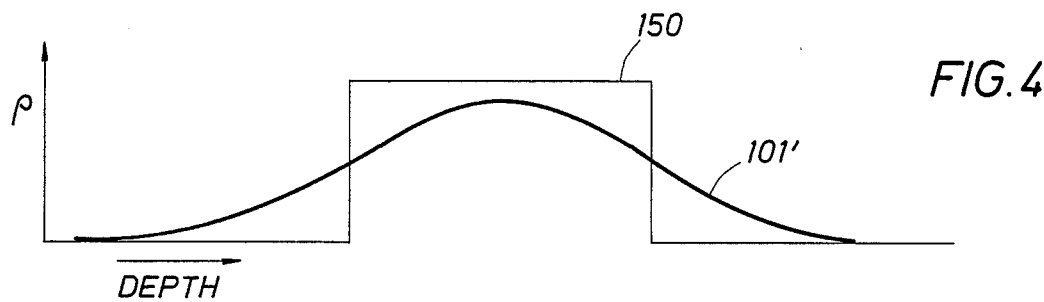
FIGS. 4–7 are graphs representative of various density readings versus depth, and illustrate a method of the present invention.

With reference now to FIGS. 3-7, a method of the present invention for determining the density, $\rho$, of a subsurface geological formation 58 traversed by a borehole 54 will be described. As previously set forth, the structure of a suitable dual-detector gamma radiation bulk density tool is structurally the same to that of tool 200 (FIG. 1), previous described, insofar as a dual-detector gamma radiation bulk density tool would also utilize a signal source, or gamma radiation source, and two signal sensors, or detectors. The detectors would be spaced different distances from the gamma radiation source, and each signal sensor would generate a sensor signal which is transmitted via an armored cable to the surface processing circuitry 56 previously described. Thus, as seen in FIG. 3, the sensor signal of the near detector and far detector 68, 70 are carried by conductors 74, 76 as previously described in connection with FIG. 2. In accordance with the invention, the desired enhanced density of the formation 58 $\rho_{ENH}$ may be expressed by the following equation:

$$\rho_{ENH} = \rho_{COMP} + \rho_{NEAR} - \hat{\rho}_{NEAR} \qquad (16)$$

wherein $\rho_{comp}$ is the environmentally compensated density of the formation 58 when utilizing the signal outputs of both the near and far detectors; $\rho_{NEAR}$ is the density computed from the actual, unaveraged signal, or count rate, of the near detector 68; and $\hat{\rho}_{NEAR}$ is the density computed from the resolution matched signal, or count rate, from the near detector.

This enhanced density, $\rho_{ENH}$, may also be expressed by the following equation:

$$\rho_{ENH} = \rho_{NEAR} + \alpha \qquad (17)$$

wherein $\alpha$ is a continuous calibration factor and is equal to the environmentally compensated density, $\rho_{comp}$, minus the resolution matched density of the near detector, $\hat{\rho}_{NEAR}$.

With reference now to FIG. 3, appropriate circuitry will be described to accomplish the method of the present invention for determining the density of a subsurface geological formation 58, and the circuitry will be also described graphically with reference to FIGS. 4-7. The sensor signals from the near and far detectors 68, 70, carried by conductors 74, 76 first have their vertical resolution matched as by passing the signals through an appropriate filter associated with resolution matching circuits 100, 100'. In this regard, whereas it was preferred to utilize two filters, with the resolution matching circuits 90, 90' of FIG. 2, it is possible to only utilize one filter when determining the density of a formation. Thus, it is preferred that the filter used to match the vertical resolution of the sensor signals from the near and far detectors 68, 70, be associated with the resolution matching circuit 100 for the sensor signal from the near detector 68 which is carried by conductor 74. Thus, resolution-matching circuit 100' is optional.

The resolution matched sensor signals from resolution matching circuits 100, 100' are then transmitted to a compensated characteristic computation circuit 101, wherein the environmentally compensated density $\rho_{comp}$ is determined in a conventional manner from the resolution matched sensor signals from circuits 100, 100'. With respect to FIG. 4, the curve 101' represents the environmentally compensated density from the near and far detectors, which is the output of circuit 101. Curve 150 is representative of the true value of the density of a particular formation located at a particular depth and represents an ideal response from an "ideal" tool.

Figure 5:
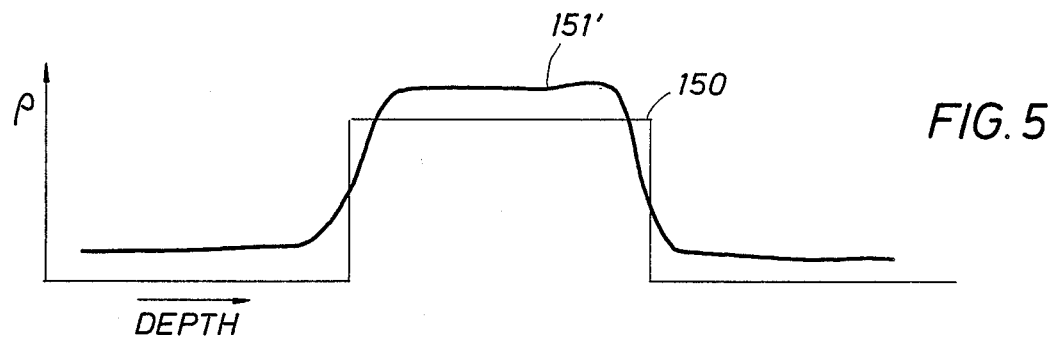
Figure 6:
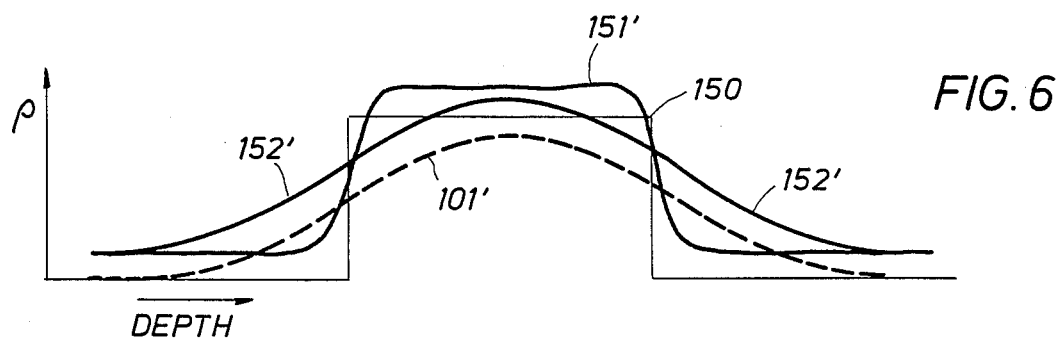
Figure 7:
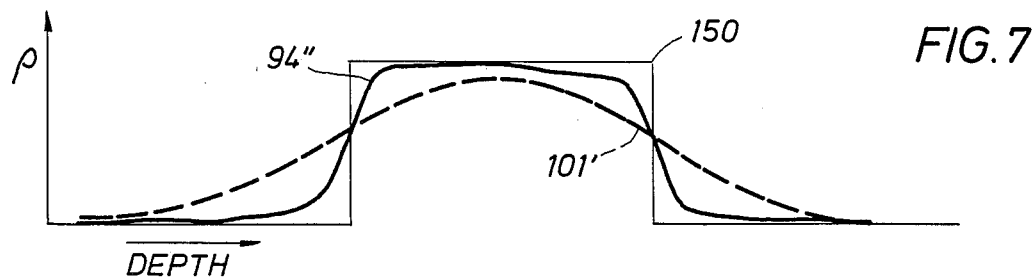

Still with reference to FIGS. 3-7, the density from the unmatched sensor signal from the near detector 68 is then determined by a near detector density computation circuit 151 which is graphically illustrated in FIGS. 5 and 6 by curve 151'. The density from the resolution matched sensor signal from the near detector from resolution matching circuit 100 is then determined by a near detector, resolution matched density computation circuit 152. The resolution matched density $\hat{\rho}_{NEAR}$ is illustrated by curve 152' in FIG. 6. The continuous calibration factor $\alpha$ may then be determined by calibration computation circuit 92' by determining the numerical difference between the environmentally compensated density, $\rho_{comp}$, from the circuit 101 and the resolution-matched density, $\hat{\rho}_{NEAR}$, from circuit 152. In accordance with equation (17), the continuous calibration factor may then be combined in enhanced resolution circuit 94' with the actual density of the near detector from circuit 151 to provide the enhanced density, $\rho_{ENH}$, wherein the vertical resolution of the density determination is enhanced. The enhanced density is illustrated by a curve 94" in FIG. 7 wherein it may be compared with the environmentally compensated density from the near and far detector, $\rho_{comp}$, and it can be seen that the resolution, or clarity, of the enhanced density value is better graphically illustrated.

As with the porosity index determinations previously described in connection with FIG. 2, the output of circuit 94' may be transmitted to a suitable recorded to produce or generate, a graph, or tangible representation, of the enhanced density.

As with the compensated neutron logging tool, the use of the term "near detector" is used to describe a detector conventionally used in various logging tools, and is not meant to encompass non-operational detectors, or sensors, or detectors which are not disposed with respect to the signal source to achieve the optimum signal from the signal sensor.

Although both embodiments previously described utilize only a near and far detector 68, 70, it should be noted that additional far detectors 70', 70", could be utilized with near detector 68.

As with the method for determining a porosity index for a formation, logging data from older wells can be reevaluated in accordance with the present method, insofar as no new logging measurements are required to obtain the enhanced resolution density of a formation. All that is required are the original output signals from the near and far detectors, which data is typically stored for older wells.

It is to be understood that the invention is not limited to the exact details of construction, operation, exact materials or embodiment shown and described as obvious modifications and equivalents will be apparent to one skilled in the art; for example, the method for determining a characteristic of a subsurface geological formation could also be applied to pairs of resistivity measurements obtained from conventional dual-induction tools, such tools being supplied with, or without, a dipmeter. Accordingly, the invention is therefore to be limited only by the scope of the appended claims.

We claim:

1. A method for determining the density of a subsurface geological formation traversed by a borehole, comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors in response to the signal from the signal source received by the at least two signal sensors;
   (d) generating the individual density responses from the at least two sensor signals;
   (e) matching the vertical resolution of the generated densities from the at least two signals;
   (f) determining an environmentally compensated density from the at least two resolution matched individual densities;
   (g) determining the differences between the compensated density of step (f) and the resolution matched density from the sensor spaced the least distance from the signal source; and,
   (h) combining the result of step (g) with the unmatched density response, from step (d), of the sensor placed nearest the source to determine the density wherein the vertical resolution of the density is enhanced.

2. The method of claim 1, further including the step of generating a tangible representation of the determined density having enhanced vertical resolution.

3. The method of claim 1, wherein the vertical resolution of the generated individual density responses from the at least two signal sensors are matched by passing at least one of the generated density responses through a filter.

4. The method of claim 3, wherein the generated density response of the signal sensor spaced the least distance from the signal source is passed through the filter.

5. A method for determining the porosity index of a subsurface geological formation traversed by a borehole, comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors, in response to the signal from the signal source received by the at least two signal sensors;
   (d) generating the individual porosity index responses from the at least two sensor signals;
   (e) matching the vertical resolution of the generated porosity index responses from the at least two signals;
   (f) determining an environmentally compensated porosity index from the at least two resolution matched porosity index responses;
   (g) determining a continuous calibration factor utilizing the environmentally compensated porosity index of step (f) and the resolution matched porosity index responses, from step (e), of the signal sensor spaced the least distance from the signal source; and
   (h) determining a porosity index wherein the vertical resolution of the porosity index is enhanced, by applying the continuous calibration factor from step (g), to the unmatched porosity index response from step (d), for the sensor spaced nearest the source.

6. The method of claim 5, further including the step of generating a tangible representation of the determined porosity index having enhanced vertical resolution.

7. The method of claim 6, wherein the vertical resolution of the generated porosity index responses from the at least two signal sensors is matched by passing at least one of the generated porosity index responses through a filter.

8. The method of claim 7, wherein the generated porosity index response of the signal sensor spaced the least distance from the signal source is passed through the filter.

9. The method of claim 5, further including the step of utilizing the continuous calibration factor to indicate the presence of gas in the geological formation.

10. The method of claim 5 further including the step of utilizing the continuous calibration factor to indicate logging conditions in the borehole.

11. A method for determining a characteristic of a subsurface geological formation traversed by a borehole, comprising the steps of:
    (a) passing a logging tool through the borehole, the logging tool having associated therewith a signal source and at least two signal sensors spaced from the signal source by different distances;
    (b) transmitting a signal from the signal source into the subsurface geological formation;
    (c) generating sensor signals from the at least two signal sensors in response to the signal from the signal source received by the at least two signal sensors;
    (d) determining individual formation characteristics from the signals from the at least two sensors;
    (e) matching the vertical resolution of the generated formation characteristic responses from the at least two signal sensors;
    (f) determining an enrivonmentally compensated characteristic of the subsurface geological formation from a combination of the resolution-matched individual characteristic responses;
    (g) determining a continuous calibration factor by utilizing the environmentally compensated characteristic of step (f) and the resolution matched formation characteristic response from the signal sensor spaced the least distance from the signal source; and
    (h) determining the desired characteristic by combining the unmatched characteristic response from step (d), of the sensor spaced the least distance from the source with the continuous calibration factor of step (g) wherein the vertical resolution of the desired characteristic is enhanced.

12. The method of claim 11, including the step of generating a tangible representation of the determined characteristic having enhanced vertical resolution.

13. The method of claim 11, wherein the vertical resolutions of the generated formation characteristic responses from the at least two signal sensors are matched by passing at least one of the generated formation characteristic responses through a filter.

14. The method of claim 13, wherein the generated formation characteristic response of the signal sensor spaced the least distance from the signal source is passed through the filter.

15. The method of claim 11, wherein the characteristic to be determined is the density of the subsurface geological formation and the environmentally compensated characteristic is an environmentally compensated density.

16. The method of claim 15, wherein the continuous calibration factor is determined by:
   determining the difference between the environmentally compensated density and the resolution matched density from the signal sensor spaced the least distance from the signal source.

17. The method of claim 16, wherein the unmatched density response from the signal sensor spaced the least distance from the signal source is calibrated by:
   combining the continuous calibration factor with the unmatched density from the signal sensor spaced the least distance from the signal source.

18. The method of claim 15, further including the step of utilizing the continuous calibration factor to indicate the presence of gas in the geological formation.

19. The method of claim 15, further including the step of utilizing the continuous calibration factor to indicate logging conditions in the borehole.

20. The method of claim 11, wherein the characteristic to be determined is the porosity index of the subsurface geological formation and the environmentally compensated characteristic is an environmentally compensated porosity index.

21. The method of claim 20, wherein the continuous calibration factor is determined by:
   utilizing the environmentally compensated porosity index and the resolution matched porosity index from the signal sensor spaced the least distance from the signal source.

22. The method of claim 21 wherein the porosity index having enhanced vertical resolution is determined by:
   applying the continuous calibration factor to the unmatched porosity index from the signal sensor spaced the least distance from the signal source.

23. The method of claim 20, further including the step of utilizing the continuous calibration factor to indicate the presence of gas in the geological formation.

24. The method of claim 20, further including the step of utilizing the continuous calibration factor to indicate logging conditions in the borehole.

* * * * *

UNITED STATES PATENT AND TRADEMARK OFFICE
CERTIFICATE OF CORRECTION

PATENT NO. : 4,794,792

DATED : January 3, 1989

INVENTOR(S) : Charles Flaum, James E. Galford, Steven W. Ducket

It is certified that error appears in the above-identified patent and that said Letters Patent is hereby corrected as shown below:

The term of this patent subsequent to November 22, 2005, has been disclaimed.

Signed and Sealed this

Eighteenth Day of July, 1989

Attest:

DONALD J. QUIGG

Attesting Officer

Commissioner of Patents and Trademarks